United States Patent [19]

Modic

[11] Patent Number: 5,242,975

[45] Date of Patent: Sep. 7, 1993

[54] PROCESS TO BLEND POLYAMIDES AND FUNCTIONALIZED ELASTOMERS AND BLENDS PREPARED BY THIS METHOD

[75] Inventor: Michael J. Modic, Richmond, Tex.

[73] Assignee: Shell Oil Company, Houston, Tex.

[21] Appl. No.: 887,566

[22] Filed: May 18, 1992

Related U.S. Application Data

[63] Continuation of Ser. No. 495,060, Mar. 19, 1990, abandoned.

[51] Int. Cl.$^5$ .............................................. C08L 77/00
[52] U.S. Cl. ...................................... 525/66; 525/92
[58] Field of Search ......................................... 525/66

[56] References Cited

U.S. PATENT DOCUMENTS

| | | | |
|---|---|---|---|
| 4,174,358 | 11/1979 | Epstein | 525/183 |
| 4,427,828 | 1/1984 | Hergenrother et al. | 525/66 |
| 4,628,072 | 12/1986 | Shiraki et al. | 525/57 |
| 4,657,972 | 4/1987 | Giles, Jr. et al. | 525/57 |
| 4,757,112 | 7/1988 | Phadke et al. | 525/66 |
| 4,783,503 | 11/1988 | Gergen et al. | 525/66 |
| 4,820,768 | 4/1989 | Shiraki et al. | 525/92 |
| 4,849,471 | 7/1989 | Saito et al. | 525/66 |
| 4,977,213 | 12/1990 | Giroud-Abel et al. | 525/66 |
| 4,983,673 | 1/1991 | Willis et al. | 525/92 |

FOREIGN PATENT DOCUMENTS 60-79059 5/1985 Japan.

Primary Examiner—Ana L. Carrillo

[57] ABSTRACT

The present invention provides a process to produce toughened nylon compositions by blending a masterbatch comprising from about 15 to about 120 parts by weight of an α-polyamide with 100 parts by weight of a functionalized hydrogenated conjugated diolefin polymer and then blending the masterbatch with a sufficient amount of α-polyamide to result in a total of from about 200 to about 2000 parts by weight of α-polyamide in the resultant composition to form a toughened nylon composition. The toughened nylon composition has a ⅛ inch notched Izod impact toughness of greater than 10 ft-lb/in at −20° F. when 20 parts by weight of the functionalized hydrogenated polyisoprene is blended according to this invention with a total of 80 parts by weight of nylon 6.

15 Claims, No Drawings

PROCESS TO BLEND POLYAMIDES AND FUNCTIONALIZED ELASTOMERS AND BLENDS PREPARED BY THIS METHOD

This is a continuation of application Ser. No. 07/495,060, filed Mar. 19, 1990, now abandoned.

FIELD OF THE INVENTION

This invention relates to a process to blend polyamides with functionalized elastomers.

BACKGROUND

Polyamides, known commercially as nylons, have excellent hardness, abrasion resistance, chemical resistance and other mechanical properties, but suffer from being brittle. Many attempts have been made to make polyamides less brittle by blending the polyamides with impact modifiers such as rubbery polymers. U.S. Pat. No. 4,174,358 discloses the use of functionalized rubbers as impact modifiers for polyamides. U.S. Pat. Nos. 4,427,828 and 4,628,072 disclose the use of acid functionalized, hydrogenated block copolymers of styrene and conjugated diolefins as impact modifiers for polyamides, and U.S. Pat. No. 4,427,828 additionally discloses the use of functionalized hydrogenated homopolymers of conjugated diolefins. The inclusion of polar functional groups on the modifiers is generally considered to be necessary for the polyamides to be acceptably compatible with rubbers which do not otherwise contain polar functionality.

The use of the acid derivative functionalized, hydrogenated styrenic block copolymers or acid derivative functionalized, hydrogenated conjugated diolefin homopolymers as impact modifiers is particularly effective in modifying polyamides which are prepared by copolymerizing diamines and dicarboxylic acids, such as nylon 6-6. When these polyamides are modified with acid derivative functionalized, hydrogenated block copolymers of styrene and butadienes, compositions may be made which fail in the ductile mode rather than the brittle mode when ⅛ inch notched Izod impact toughness is tested by ASTM-D256. Further, with a sufficient amount of modifier the ductile failure will remain at temperatures which are as low as $-20°$ F.

Polyamides which are prepared by polymerizing monoaminocarboxylic acids or internal lactame thereof, such as nylon 6, are more difficult to toughen with acid functionalized hydrogenated polymers of conjugated diolefins or copolymers of conjugated diolefins and vinyl aromatics. Polyamides prepared by polymerizing monoaminocarboxylic acids or their internal lactams have an amine functional group at one terminal and a carboxyl group at the other terminal. Nylons prepared by copolymerizing diamines and dicarboxylic acid generally performed in an excess of diamines. When the polymerization is not carried out with an excess of diamines, polyamides such as these will be a combination of polymer molecules having two terminal amines, two terminal carboxylic acids, and one of each terminal groups. The two types of nylons, because of this difference in terminal functionality, have inherently different compatibilities with functionalized polymeric modifiers. The functionalized polymers are significantly more compatible with nylon 6 than they are with nylon 6-6. Because of this difference in compatibility, acid derivative functionalized, hydrogenated polyconjugated diolefins will form smaller domains when mixed with nylon 6 than when mixed with nylon 6-6 in conventional mixing devices. The particle size of modifier in nylons greatly effects the effectiveness of the toughening modifier. As a result, functionalized polymers are not as effective as toughening modifiers in nylon 6 as they are in nylon 6-6.

Nylon 6-6 compositions may be made by high shear blending of functionalized hydrogenated block copolymers of styrene and butadiene with the nylon 6-6 which exhibit ductile failure rather than brittle failure in a ⅛" notched Izod impact toughness test, at temperatures at or below $-20°$ F. About 20 weight percent modifier is required to achieve this result. Nylon 6, on the other hand, requires much more modifier to achieve ductile failure at $-20°$ F. The higher levels of modifier are undesirable because they result in a less stiff composition, sacrificing more of the excellent properties of the nylon. The lack of stiffness is indicated by a modulus which is low. This can be undesirable for many applications.

Polyamides which have carboxylic acid, or a derivative thereof as one terminal group and an amine as another terminal group will be referred to generally as α-polyamides. These α-polyamides may be formed by ring-opening of lactams and polymerization of monoaminocarboxylic acids.

It is therefore an object of this invention to provide a process to blend α-polyamides with acid derivative functionalized hydrogenated conjugated diolefin polymers which result in improved toughness of the resulting composition. In another aspect, it is an object to provide a modified α-polyamide composition comprising 20 parts by weight or less of modifier for each 80 parts by weight α-polyamide, the composition exhibiting ductile failure in a ⅛" notched Izod toughness test at $-20°$ F., the modifier being an acid derivative functionalized hydrogenated conjugated diolefin polymer.

SUMMARY OF THE INVENTION

It has been surprisingly discovered that the objects of the present invention are achieved by blending a masterbatch comprising from about 15 to about 120 parts by weight of an α-polyamide, with 100 parts by weight of a functionalized hydrogenated conjugated diolefin polymer, then blending the masterbatch with a sufficient amount of an α-polyamide to result in a total of from about 200 to about 2000 parts by weight of α-polyamide in the resultant toughened α-polyamide composition. The toughened α-polyamide composition has a ⅛ inch notched Izod impact toughness of greater than 10 ft-lb/in at $-20°$ F. with about 20 percent by weight of functionalized hydrogenated conjugated diolefin polymer.

The masterbatch contains α-polyamide in a dispersed phase, and the subsequent blending of the additional α-polyamide results in a phase inversion which apparently traps some of the masterbatch α-polyamide in the rubber particles of the final blend. This results in rubber particles which are effectively larger, and more effective in modifying the toughness of the final α-polyamides composition. Because the toughening of the modifier is more effective, less modifier is necessary for a given level of toughness. This results in a α-polyamides composition which has improved stiffness at similar toughness.

DETAILED DESCRIPTION OF THE INVENTION

The polyamides useful in this invention, which will be referred to as α-polyamides, include those polyamides which have one terminal amine and one terminal carboxylic acid group. This will be the case for polyamides which are formed by ring-opening of lactams and polymerization of monoaminocarboxylic acids. Suitable polyamides are described in U.S. Pat. Nos. 2,071,250; 2,071,251; and 2,241,322 which are incorporated herein by reference. Because the final structure of the polymer is determative, the method used to arrive at this final structure is not limiting.

As examples of aminocarboxylic acids and lactams there may be mentioned ε-aminocaproic acid, butyrolactam, pivalolactam, carpolactam, capryllactam, enantholactam, undecanolactam, dodecanolactam and 3- and 4-amino benzoic acids.

Illustrative examples of polyamides which may be incorporated in the polymer blends of the invention include:
polypyrrolidone (nylon 4);
polycaprolactam (nylon 6);
polyheptolactam (nylon 7);
polycapryllactam (nylon 8);
polynonanolactam (nylon 9);
polyundecanolactam (nylon 11); and
polydodecanolactam (nylon 12).

The α-polyamides are preferably linear but could be of other configurations, such as branched. The polyamide may be a copolymer with other monomer units, so long as the polymer is predominatedly α-polyamides.

The acid functionalized hydrogenated conjugated diolefin polymer may be prepared by functionalizing an appropriate base polymer, or by copolymerizing acid containing monomers with the conjugated diolefins.

Other types of monomer units may also be incorporated into the polymer. These other types of monomer units may be incorporated in random, block or tapered fashion. The amount of other monomers which may be incorporated into the polymer depends greatly on the properties of polymers derived from these other monomers. If the other monomer forms separate glassy phases, or forms polymers which have high crystallinity, only about 10 percent by weight of the modifier could be derived from these other units. If these other monomer units form polymers which are rubbery, a higher content of non-conjugated diolefin monomer units could be used.

The acid functionalized hydrogenated conjugated diolefin polymer may be of a radial, linear or branched configuration, but is preferably of a radial configuration because radial homopolymers of conjugated diolefins can be handled as crumb. Linear polymers of functionalized conjugated diolefin polymers are generally supplied as bales and not crumbs due to excessive coldflow. The preferred radial, acid derivative functionalized, hydrogenated conjugated diolefin polymer has from four to about 30 arms extending from a suitable coupling agent. The diolefin polymer arms may be homopolymers or copolymers of conjugated diolefins having from four to about twelve carbon atoms.

Any of the coupling agents known in the prior art to be useful in the production of radial polymers may be used in preparing the radial polymers of the present invention. Suitable coupling agents include those which are nonpolymerizable and which contain a fixed number of reactive sites, such as tetrachloro benzene, carbon tetrachloride and silicon tetrachloride. Coupling agents which are polymerizable are also acceptable, such as the poly-alkenyl coupling agents taught in U.S. Pat. No. 3,985,830; Canadian Patent No. 716,645 and British Patent No. 1,025,295, which are incorporated herein by reference.

Radial polymers useful as modifiers in the compositions of this invention may be prepared by first forming a living diolefin polymer and then reacting the living diolefin polymer with a suitable coupling agent and then hydrogenating the resulting radial polymer. Useful radial polymers may be prepared using the techniques summarized in U.S. Pat. Nos. 4,116,917 and 4,156,673, which are incorporated herein by reference. When the radial polymer coupling agent is one having a fixed number of reactive sites, the average number of arms in the polymer will, generally, be controlled by the number of reactive sites in the coupling agent. When the coupling agent is polymerizable, the average number of arms in the radial polymer will, generally, be controlled by the relative amount of living polymer and coupling agent actually combined.

The conjugated diolefin polymer arms used in the radial polymer incorporated to the compositions of this invention will have a weight average molecular weight within the range from about 2000 to about 500,000.

The radial polymer will be hydrogenated so as to hydrogenate at least about 90 percent of the initial ethylenic unsaturation contained in the polymer. Preferably, the hydrogenation will hydrogenate greater than about 98 percent of the initial ethylenic unsaturation. The hydrogenation will preferably be accomplished with the reaction product of an aluminum alkyl and a nickel carboxylate in a manner as taught in U.S. Pat. No. 3,700,633.

When the base polymer does not contain acid derivative functionality the functionality must be grafted on to the base polymer. In general, any carboxylic acid or derivative thereof having the ability to react with the base polymer in a free radical initiated reaction is useful to effect the modification need for the compositions of the present invention. Useful modifying compounds may be polymerizable or nonpolymerizable compounds but are preferably nonpolymerizable or only slowly polymerizable. When the modifying compound is nonpolymerizable or slowly polymerizable the grafting reaction will favor the introduction of a single unit at each site of introduction. Also, preparation of a homopolymer of the compound used for the grafting which could ultimately separate from the other components in the polymer composition will be avoided by the use of nonpolymerizable or slowly polymerizable modifying compounds.

While any acid or acid derivative which may be grafted or otherwise reacted with the hydrogenated radial polymer may be used, the compounds most commonly used contain ethylenic unsaturation. In general, essentially any acid or acid derivative could, initially, be incorporated into the base polymer, even those containing groups which groups do not, per se, facilitate performance of the functionalized, hydrogenated polymer as an impact modifier so long as these groups can conveniently be converted to a functional group which will facilitate performance of the modified polymer as an impact modifier. Groups that are particularly effective include acid, salts, anhydrides, esters, imides and amides.

The compound containing the functional group will be grafted to the base polymer in an amount within the range from about 0.1 to about 10, preferably from about 0.3 to about 5.0, and most preferably from about 0.3 to about 3.0 weight percent based on the functionalized polymer. Lower levels of functionality are ineffective in improving the compatibility of the modifier with the polyamide. Higher levels of functionality are not preferred because incorporation of the high level of functionality results in an excessively degraded polymer.

Useful compounds which may be grafted to the base polymer include ethylenically unsaturated mono- and polycarboxylic acids and derivatives thereof, particularly dicarboxylic acids, containing from about three to about ten carbon atoms and preferably a single ethylenic unsaturation. Suitable derivatives include the corresponding anhydrides, salts, esters, ethers, amides, nitriles, thiols, thioacids, glycidyls, cyanides and the like. Examples of compounds which may be grafted to the base polymer include acrylic acid, methacrylic acid, citraconic acid, maleic acid, fumaric acid, itaconic acid, corresponding anhydrides of these acids, esters of these acids, glycidyl acrylate and methacrylate, cyanoacrylates, hydroxy substituted alkyl acrylates and methacrylates and the like.

The base polymer may be functionalized using any of the techniques known in the prior art for grafting functional groups to such polymers. For example, the modified, hydrogenated radial polymer may be prepared using solution processes such as those taught in U.S. Pat. Nos. 4,033,888; 4,077,893; and 4,670,173, which are incorporated herein by reference, or with melt-mixing processes such as those taught in U.S. Pat. Nos. 4,427,828; 4,578,429; and 4,657,971, which are incorporated herein by reference.

After functionalization has been completed, it is advantageous to remove any excess, unreacted functionalizing agent since these materials could compete with functionalizing groups incorporated into the polymer for reaction with reactive groups in the polyamide polymers. This could, in turn, reduce the number of reactive sites available for reaction with the acid functionalized hydrogenated polymer thereby reducing the effectiveness of the modified polymer as an impact modifier.

A masterbatch may be prepared by blending from about 15 parts by weight to about 120 parts by weight of an α-polyamide with 100 parts by weight of functionalized hydrogenated polymer. The masterbatch must have a ratio of α-polyamide to functionalized hydrogenated polymer which is low enough to result in the α-polyamide being in a dispersed phase. Greater amounts of α-polyamide result in the α-polyamide not being in a dispersed phase, whereas a lesser amount of α-polyamide will not alter the nature of the modifier sufficiently to result in significant advantages. More preferably, about 30 to about 90 parts by weight of α-polyamides per 100 parts by weight of functionalized hydrogenated polymer are incorporated into the masterbatch to achieve the best achievable level of toughness with the minimum amount of modifier.

The blending may be performed in equipment such as single and multiple screw extruders, mixing rollers, Brabender mixers, Banbury mills, kneaders and the like. When equipment of this type is used, the blending will be accomplished with the polymeric components in the molten phase and at temperatures sufficiently high to maintain this condition.

The masterbatch is then blended with the remaining α-polyamide to form the modified α-polyamide composition. The masterbatch may be blended with the remaining α-polyamide in equipment such as single and multiple screw extruders, mixing rollers, Brabender mixers, Banbury mills, kneaders and the like. The blending of the masterbatch with the α-polyamide may be performed by injecting the α-polyamide into a melt of the masterbatch, as when a second injection port of an extruder is utilized to inject α-polyamide into the masterbatch which is already in the extruder. This can be preferred to as a one-step mixing process. Alternatively, the masterbatch may be mixed, and recovered as solids and then mixed with the remaining α-polyamide in a separate extrusion step. This can be referred to as a two-step mixing process.

The masterbatch must contain α-polyamide in a dispersed phase, and the subsequent blending of the additional α-polyamide will then result in a phase inversion which apparently traps some of the masterbatch α-polyamide the rubber particles of the final blend. This results in rubber particles which are effectively larger, and more effective in modifying the toughness of the final α-polyamide composition. Because the toughening of the modifier is more effective, less modifier is necessary for a given level of toughness. Because of the compatibility of modifiers with α-polyamides, having larger particle sizes increases the effectiveness of the modifiers.

The compositions prepared according to the present invention may incorporate other components known in the art to be useful in polyamide compositions. These other components include, for example, fillers, pigments, antioxidants, stabilizers, processing oils, extenders, mold release agents and the like. These additives may generally be added to the masterbatch, to the α-polyamide which is added to the masterbatch, or to the final compositions. The only restriction is that the α-polyamide must be a dispersed phase in the masterbatch.

When α-polyamide compositions are modified according to the present invention, the resultant compositions have significantly greater toughness than compositions prepared by blending the components conventionally. Because a desired toughness can be achieved with less modifier, the resultant compositions have significantly greater stiffness, as indicated by a higher modulus than similarly tough compositions which were blended conventionally. The functionalized hydrogenated polymers are also considerably more expensive than α-polyamides, so compositions prepared by the method of the present invention are less expensive than similarly tough compositions prepared by conventional blending.

A particular milestone in toughness of nylon blends is the failure in a ductile mode rather than a brittle mode at −20° F. in an ⅛ inch Izod impact toughness test. This ductile failure is generally observed at an Izod impact toughness of 10 ft-lb/in and greater. Conventionally blended compositions of 20 parts by weight of hydrogenated radial polyisoprene which have been functionalized by grafting to it maleic anhydride in the presence of a free radical initiator, and 80 parts by weight of nylon 6 do not fail in a ductile mode of −20° F., but fail in a brittle mode. The same composition, when prepared according to the present invention, fails in a ductile mode.

EXAMPLES

Masterbatch compositions were prepared by extruding a commercially available nylon 6 with varying amounts of a maleic anhydride modified hydrogenated radial polyisoprene. These masterbatches were then extruder blended with nylon 6 to form final compositions containing 20 percent by weight of modified hydrogenated radial polyisoprene and 80 percent by weight of nylon 6.

The base polyisoprene was prepared by preparing living polyisoprene homopolymer arms by polymerizing isoprene with an sec-butyl lithium catalyst to a weight average molecular weight of about 64,000 and then reacting this living isoprene homopolymer arms with divinyl benzene. The radial polymer was then hydrogenated in the presence of a catalyst prepared by combining nickel 2-ethylhexanoate and triethyl aluminum. More than 98% of the initial ethylenic unsaturation was hydrogenated. A portion of this polymer was then grafted with 1.6 weight percent maleic anhydride by passing the polymer, maleic anhydride and a peroxide through a twin screw extruder at a temperature of about 260° C.

The nylon 6 utilized in the examples, is Capron® which is commercially available from Allied-Signal Corporation. It has a number average molecular weight of about 18,000.

Masterbatches which contained 20, 40, 50, 60 and 80 percent by weight of nylon 6 in the modified hydrogenated radial polyisoprene were prepared. The masterbatches were blended by combining the polymers in a twin screw extruder at a temperature of about 260° C. Pellets of the masterbatched materials were recovered and then blended with the remaining nylon 6 so as to produce the final blends in a twin screw extruder. Portions of each were then molded into specimens suitable for testing using ASTM procedure D-256 to determine ⅛ inch notched Izod values at room temperature and at −20° F.

Table 1 lists the Izod impact toughness at room temperature and −20° F. for each of the compositions, and the flexural modulus of each.

The composition having 80 percent of nylon 6 incorporated in the masterbatch represents the conventional blending of the nylon with the modifier. As can be seen from Table 1, preparation of the masterbatch with between about 15 to 50 percent of nylon 6 in the masterbatch results in final compositions which demonstrate ductile failure in a ⅛ inch notched Izod impact toughness test at −20° F. From Table 1 it can also be seen that the improvement in toughness comes at only a small decrease in modulus.

Compositions were also prepared with 10 and 30 percent weight of the same functionalized hydrogenated radial polyisoprene with nylon 6 by simply blending the nylon 6 with the functionalized hydrogenated radial polyisoprene in a twin screw extruder at a temperature of about 260° C. Table 2 lists the Izod toughness at room temperature and at −20° F. and the flexural modulus of these compositions along with the conventionally blended 20% by weight modifier composition described above. From Table 2 the significance of obtaining ductile failure with less modifier may be seen. It takes nearly 30 percent by weight of this modifier to accomplish ductile failure of the nylon 6 composition when the components are conventionally blended. Although the use of the masterbatch method of blending the modifier results in some loss of modulus, the loss in modulus in much less than the loss incured by increasing the amount of modifier enough to achieve similar toughness. Additionally, similarly tough compositions prepared according to this invention contain less expensive materials due to the lower cost of the nylon 6 compared to the modifier.

TABLE 1

Masterbatch Blended Compositions - 80% Nylon 6 and 20% Modifier

| Percent wt Nylon 6 in Masterbatch | Room Temp. Izod-ft lb/in | −20° F. Izod-ft lb/in | Flexural Modulus |
|---|---|---|---|
| 20% wt | 14.7 | 10.9 | 205 |
| 40% wt | 15.4 | 13.8 | 200 |
| 50% wt | 11.6 | 10.3 | 202 |
| 60% wt | 8.7 | 6.0 | 215 |
| 80% wt | 5.5 | 4.6 | 228 |

TABLE 2

Conventionally Blended Compositions

| Percent wt Modifier in Nylon 6 Composition | Room Temp. Izod-ft lb/in | −20° F. Izod-ft lb/in | Flexural Modulus |
|---|---|---|---|
| 10% wt | 3.2 | 2.5 | 299 |
| 20% wt | 5.5 | 4.6 | 228 |
| 30% wt | 18.6 | 16.7 | 163 |

I claim:

1. A process to prepare a toughened α-polyamide composition comprising the steps of:
   a) providing 100 parts by weight of a toughener, the toughener comprising a functionalized hydrogenated polymer comprising hydrogenated conjugated diolefin monomer units and functional moieties selected from a group consisting of acid, anhydride, salt, ester, imide, and amide moieties;
   b) blending the toughener with from about 15 to about 120 parts by weight of α-polyamide to form a masterbatch; and
   c) blending the masterbatch with a sufficient amount of α-polyamide to provide a toughened α-polyamide composition which comprises 400 parts by weight of α-polyamide.

2. The process of claim 1 wherein in the masterbatch the toughener is in a continuous phase.

3. The process of claim 1 wherein the functionalized hydrogenated polymer is a functionalized hydrogenated radial polymer comprising hydrogenated conjugated diolefin monomer units.

4. The process of claim 1 wherein the hydrogenated conjugated diolefin monomer units are hydrogenated isoprene.

5. The process of claim 1 wherein the hydrogenated conjugated diolefin monomer units are hydrogenated butadiene.

6. The process of claim 3 wherein the functionalized hydrogenated polymer is a functionalized hydrogenated radial polyisoprene.

7. The process of claim 3 wherein the functionalized hydrogenated polymer is a functionalized hydrogenated radial polybutadiene.

8. The process of claim 1 wherein the masterbatch and the α-polyamide are mixed in an apparatus selected from the group consisting of extruder, mixing roller, Brabender mixer, Banbury mill and kneader.

9. The process of claim 1 wherein the toughener and α-polyamide are blended in an apparatus selected from the group consisting of extruder, mixing roller, Brabender mixer, Banbury mill, and kneader.

10. The process of claim 1 wherein the α-polyamide is nylon 6.

11. The process of claim 1 wherein the α-polyamide is selected from the group consisting of nylon 4, nylon 7, nylon 8, nylon 9, nylon 11 and nylon 12.

12. The process of claim 1 wherein the functionalized hydrogenated polymer is produced by copolymerizing monomers containing the functional moieties with the conjugated diolefin monomer units prior to hydrogenation.

13. The process of claim 1 wherein the functionalized hydrogenated polymer is produced by grafting a compound to a base hydrogenated polymer, the compound containing ethylenic unsaturation and the functional moieties.

14. The process of claim 13 wherein the compound is maleic anhydride.

15. The process of claim 1 wherein the toughened α-polyamide has a ⅛ inch notched Izod impact at $-20°$ F. as determined by ASTM-D256, of 10 ft-lb/in or greater.

* * * * *